(12) United States Patent
Fukui et al.

(10) Patent No.: US 11,447,342 B2
(45) Date of Patent: Sep. 20, 2022

(54) BALL TRANSFER AND SEAL MEMBER FOR BALL TRANSFER EMPLOYING PILE SEAL MEMBER

(71) Applicants: SANWA TECHNO CO., LTD., Kobe (JP); FREEBEAR CORPORATION, Higashiosaka (JP)

(72) Inventors: Kazuro Fukui, Kobe (JP); Toshio Takino, Kobe (JP); Kaito Oomae, Kobe (JP); Nagamasa Maruyama, Kobe (JP); Hiroyuki Furuuchi, Higashiosaka (JP); Atsushi Sakane, Higashiosaka (JP)

(73) Assignees: SANWA TECHNO CO., LTD., Kobe (JP); FREEBEAR CORPORATION, Higashiosaka (JP)

( * ) Notice: Subject to any disclaimer, the term of this patent is extended or adjusted under 35 U.S.C. 154(b) by 0 days.

(21) Appl. No.: 17/059,311

(22) PCT Filed: May 11, 2020

(86) PCT No.: PCT/JP2020/018885
§ 371 (c)(1),
(2) Date: Nov. 27, 2020

(87) PCT Pub. No.: WO2021/019866
PCT Pub. Date: Feb. 4, 2021

(65) Prior Publication Data
US 2021/0207299 A1     Jul. 8, 2021

(30) Foreign Application Priority Data
Jul. 30, 2019    (JP) .............................. JP2019-140367

(51) Int. Cl.
*B65G 39/09* (2006.01)
*B65G 39/02* (2006.01)
(Continued)

(52) U.S. Cl.
CPC ........... *B65G 39/09* (2013.01); *B65G 39/025* (2013.01); *D03D 27/00* (2013.01); *F16C 33/78* (2013.01); *F16C 29/04* (2013.01)

(58) Field of Classification Search
CPC ...... B65G 39/02; B65G 39/09; B65G 39/025; F16C 33/76; F16C 33/78
(Continued)

(56) References Cited

U.S. PATENT DOCUMENTS 5,540,314 A  *  7/1996  Coelln ................. B65G 39/025
                                                                193/35 MD
5,672,012 A  *  9/1997  Malone ................ B65G 39/025
                                                                193/35 MD
(Continued)

FOREIGN PATENT DOCUMENTS

JP      2012-21556 A      2/2012
JP      2014-37844 A      2/2014
(Continued)

OTHER PUBLICATIONS

International Search Report and Written Opinion in Japanese dated Jul. 28, 2020, issued in counterpart International Application No. PCT/JP2020/018885 (8 pages).

*Primary Examiner* — Douglas A Hess
(74) *Attorney, Agent, or Firm* — WHDA, LLP (57) ABSTRACT

To provide a ball transfer and a seal member for a ball transfer, a seal member is employed which is characterized in that it has a seal member employing pile fiber that, at a ball transfer having a main body which has a socket, an inner surface of which is a hemispherical concave surface, a plurality of ball bearings arranged at the main exterior socket, a primary ball, diameter of which is greater than that of said ball bearings and which is rotatably supported by the socket by way of the ball bearings, and a housing-like case which surrounds the main body socket and rotatably sup- (Continued)

ports the ball bearings and the primary ball at a bearing portion thereof and which has a hole from which a portion of the primary ball is made to protrude at an upper surface of the primary ball socket.

8 Claims, 4 Drawing Sheets

(51) Int. Cl.
  *F16C 33/76*  (2006.01)
  *F16C 33/78*  (2006.01)
  *D03D 27/00*  (2006.01)
  *F16C 29/04*  (2006.01)
(58) Field of Classification Search
  USPC .................................................. 193/35 MD
  See application file for complete search history.

(56) References Cited

U.S. PATENT DOCUMENTS

| | | | | |
|---|---|---|---|---|
| 6,164,429 | A * | 12/2000 | Masciarelli, Jr. | B65G 13/12 |
| | | | | 193/35 SS |
| 6,516,934 | B2 * | 2/2003 | Masciarelli, Jr. | B65G 13/12 |
| | | | | 193/35 MD |
| 6,786,318 | B1 * | 9/2004 | Pace | B23Q 1/38 |
| | | | | 193/35 MD |
| 6,814,212 | B1 * | 11/2004 | Ebersole | B65G 13/11 |
| | | | | 193/35 MD |
| 7,007,787 | B2 * | 3/2006 | Pallini | B65G 39/025 |
| | | | | 193/35 MD |
| 7,445,387 | B2 * | 11/2008 | Iguchi | F16C 29/002 |
| | | | | 384/49 |
| 7,455,470 | B2 * | 11/2008 | Brodowski | F16C 11/0619 |
| | | | | 384/49 |
| 8,011,307 | B2 * | 9/2011 | Marcelli | F16C 29/046 |
| | | | | 108/55.3 |
| 8,635,960 | B2 * | 1/2014 | Iguchi | B65G 39/025 |
| | | | | 108/139 |
| 8,702,312 | B2 * | 4/2014 | Yamada | F16C 33/7879 |
| | | | | 384/477 |
| 8,864,436 | B2 * | 10/2014 | Deng | B21B 39/22 |
| | | | | 414/774 |
| 8,960,401 | B2 * | 2/2015 | Parsons | B23K 37/0408 |
| | | | | 193/35 SS |
| 9,284,128 | B2 * | 3/2016 | Stegmiller | B65G 13/00 |
| 10,137,731 | B2 * | 11/2018 | Willis | B60B 19/003 |
| 10,442,630 | B2 * | 10/2019 | Zheng | B65G 49/064 |
| 2015/0217614 | A1 | 8/2015 | Aoki | |

FOREIGN PATENT DOCUMENTS

| | | |
|---|---|---|
| JP | 2018-165562 A | 10/2018 |
| JP | 2018-204638 A | 12/2018 |

* cited by examiner

[FIG. 2]

BALL TRANSFER AND SEAL MEMBER FOR BALL TRANSFER EMPLOYING PILE SEAL MEMBER

TECHNICAL FIELD

The present invention relates to a seal member for a ball transfer capable of being utilized in a splitter platform or the like such as will permit a conveyed object that is placed onto a location covered with a plurality of ball transfers at a distribution line or the like to move in other direction(s), and to a ball transfer employing said seal member for a ball transfer.

BACKGROUND ART

Ball transfers are employed in equipment for facilitating movement of conveyed objects in distribution lines and the like. When a conveyed object is placed onto ball transfers at a location covered with a plurality of ball transfers, because balls arranged so as to be capable of rotating freely in any direction at the sockets of the respective ball transfers support the conveyed object via point contact, causing movement in other direction(s) to be greatly facilitated, they are in general use in splitter platforms and so forth for conveyed objects.

Because movement of conveyed objects is permitted thereby, entry of foreign objects originating from such conveyed objects and/or the like into the interior of the socket or the like of a ball transfer will interfere with rotation of the ball, which will constitute an impediment to the movement of the conveyed objects. For this reason, to prevent entry of foreign objects into the interior of the socket or the like of a ball transfer, devices employing seal members such as metal seals, felt, rubber seals, and resin seals have conventionally been manufactured and sold. Furthermore, it has also been proposed to employ a device in which a support-ball-restraining ring that increases the rotational resistance of the primary ball is used to suppress scattering of particles from socket recessed locations (see Patent Reference No. 1). However, not only is the structure of the proposed device complicated, but as a structure different from that of the conventional device would have to be provided at the interior of the ball transfer, and as a new die and so forth would be necessary, it would result in increased manufacturing cost.

PRIOR ART REFERENCES

Patent References

Patent Reference No. 1: Japanese Patent Application Publication Kokai No. 2012-21556

SUMMARY OF INVENTION

Problem to be Solved by Invention

Conventional ball transfers have employed a metal seal, felt, rubber seal, or resin seal as seal member to prevent entry of foreign objects thereinto from the exterior of the ball transfer. Such seal members as have been employed conventionally have been widely employed, and have, with respect to entry of foreign objects, generally provided effectiveness with respect thereto. However, upon carrying out a detailed investigation and study of ball transfers employing such seal members of the conventional type, it became clear to the Applicant that, apart from what might be said regarding entry of foreign objects, these had a variety of problems.

At ball transfers employing seal members of the metal type, not only was there generation of particulate due to wear as a result of the rolling occurring between the small balls and the large ball due to contact at the seal member and the large ball, but wear also caused generation of metal particulate that was peculiar to the seal member. In addition, it was learned that such particulate due to wear which was produced caused abrasion of the small balls and the large ball and was a factor in shortening the life of the ball transfer, and it was realized that there was a need to suppress generation of such particulate due to wear and to prevent ball wear. Furthermore, as mutual sliding of metal causes generation of a loud and unpleasant metallic sound, the environments in which these may be used are limited. For this reason, there has been demand for improvement from users who desire low-noise characteristics. One means for achieving low-noise characteristics that has been contemplated is use of a large ball made of resin. However, where resin is used as the material of the ball, due to the difference in hardness therebetween, the metal-type seal member will cause abrasion of the large ball made of resin, such that there will be substantial and rapid wear of the ball. This being the case, where a ball transfer which employs a large ball made of resin is used, as it will not be possible to use a metal seal, it will not be possible for this to be used at a site where foreign objects are present.

At ball transfers employing seal members of the felt type, to ensure adequate seal characteristics it was necessary to employ a large lip width, and to in addition cause this to be pressed against the large ball with considerable force. For this reason, because it is inescapable that frictional resistance will be high, there has been the problem that operability tends to be affected by the increase in drag. To address this, there have been attempts to improve operability by suppressing frictional resistance by causing the felt to be impregnated in advance with lubricating oil so as to suppress frictional resistance. However, upon carrying out detailed investigation and study, it was found when used for an extended period that frictional resistance increases as a result of the fact that the lubricating oil is used up, and furthermore that to the extent that the seal member has been made to press against the large ball with considerable force, there is a tendency for sliding due to rotation to cause the seal member to deform and there is a tendency for seal function to deteriorate. Furthermore, because lubricating oil adheres to the large ball, the range of conditions over which it can be used is limited. It being, practically speaking, difficult, at a point in time when the lubricating oil with which the felt was impregnated is used up or at a point in time prior thereto, to, while the ball transfer is in the process of being used and without disassembling the ball transfer, cause it to be wetted with an appropriate amount of lubricating oil and prevent deformation of the seal member or restore it to its original shape, further improvements have been sought with respect thereto.

At ball transfers employing seal members having rubber seals, it was found that frictional resistance increases because a nip is formed when the rubber of the seal member comes in contact with the large ball. Furthermore, when the large ball rolls at high speed, the fact that the rubber seal vibrates and is lifted up causes it to wrap about the large ball, and because the seal member becomes sandwiched in the gap between it and the case, rolling resistance becomes extremely high. In addition, it was determined that if this is continued to be used while in this state, the rubber of the seal member suffers damage and stops functioning as a seal. Furthermore, it was determined that there were problems whereby vibration of the rubber caused generation of a fluttering sound and whereby noise was produced during rotation of the large ball, these being issues that ought to be improved.

At ball transfers employing seal members having resin seals, where the large ball in contact therewith is a metal ball, there is a problem whereby there will be occurrence of abrasion at the seal member due to the difference in hardness therebetween, as a result of which usage thereof is limited to situations in which the large ball is made of resin. However, to prevent static electricity and wear due to mutual contact and friction between resinous bodies, there have also been restrictions with respect to the permitted combinations of seal members and balls, as a result of which there has been a reduction in the degrees of freedom available during design thereof, improvement with respect to which is required. Furthermore, it was found that particulate produced as a result of abrasion of resin accumulates at the interior of the ball transfer, and that mixture thereof with particulate produced due to wear as a result of rotation of the large ball and the small balls results in a sludge-like mass that sticks and adheres to the surfaces of the small balls, as a result of which there is greater deterioration of the small balls, which is a factor in causing a decrease in the life of the ball transfer, improvement with respect to which is required.

It was thus learned that while conventional seal members for ball transfers such as metal seals, felt, rubber seals, and resin seals possess basic ball transfer performance by which entry of foreign objects thereinto is prevented, it was observed that with continuous use of such ball transfers there were a wide variety of disadvantages which included increase in frictional resistance, increase in noise, loss of seal characteristics, and wear not only of the small balls but also of the other respective members, improvement with respect to which is required.

Moreover, because seal members of the conventional type such as metal seals, rubber seals, and resin seals were inferior with respect to ability to conform to the case, dies of precise dimensional accuracy being required for provision of adequate sealing effect, this was a factor in causing increase in manufacturing cost. Furthermore, where product shape and/or dimensions of the ball transfer itself are to be changed, with a conventional seal member such as a rubber seal or a resin seal for a ball transfer, it has been necessary to fabricate a new die for molding of the rubber seal or resin seal to accommodate the change in product shape and/or dimensions of the ball transfer, which has been a factor in causing increase in manufacturing cost, and it has also been the case that there have been few degrees of freedom at times when the design is to be changed, and the speed with which changes in design could be accommodated has been low. Improvement has also been sought with respect to such issues.

A problem to be solved by the invention under application is to therefore provide a novel seal member for a ball transfer which possesses basic performance by which entry of foreign objects into the interior of the ball transfer is prevented, without requiring a change in product shape and/or dimensions of the conventional ball transfer itself. In addition, a further problem to be solved by the invention under application is to, in addition to the aforesaid basic performance, even in situations in which the ball transfer is used continuously for a long period of time, permit the basic performance by which entry of foreign objects into the interior of the ball transfer is prevented to be maintained, and prevent generation and accumulation of particulate due to wear at the interior of the ball transfer, or leakage of particulate due to wear to the exterior of the ball transfer, and achieve increased product life. Furthermore, a further problem to be solved by the invention under application is to improve sound prevention characteristics during use in situations in which the ball transfer is used continuously for a long period of time. Moreover, a problem to be solved by the invention under application is to provide a novel seal member for a ball transfer and a ball transfer employing same that are capable of solving the foregoing problems without requiring a change in the shape of ball transfers that have come to be used conventionally.

Means for Solving Problem

A first mean s in accordance with the present invention for solving the foregoing problems is a seal member for a ball transfer 1 characterized in that it has a seal member employing pile fiber 1a that, at a ball transfer 100 having a main body which has a socket 101, an inner surface of which is a hemispherical concave surface 102a, a plurality of ball bearings 103 arranged at the main body socket, a primary ball 104, diameter of which is greater than that of said ball bearings and which is rotatably supported by the socket by way of the ball bearings, and a housing-like case 105 which surrounds the main body socket and rotatably supports the ball bearings and the primary ball at a bearing portion thereof and which has a hole from which a portion of the primary ball is made to protrude at an upper surface of the primary ball socket, is arranged such that, at a space formed between the housing-like case and the primary ball and the main body 106, a fiber tip portion is bent so as to occlude a gap between said primary ball and said housing-like case 107 and cause said fiber tip portion to abut the primary ball; and an adhesive member for causing adhesion between the seal member comprising pile and the housing-like case. As the adhesive member 1b, any desired substance may be used so long as it is adhesive that is ordinarily used for pile base fabric adhesion. Furthermore, double-sided adhesive tape or adhesive tape at which adhesive has been applied to the substrate thereof may be used.

A second means in accordance with the present invention is the seal member for the ball transfer 1 according to first means characterized in that the pile fiber of the seal member is cut pile.

A third means in accordance with the present invention is the seal member for the ball transfer 1 according to any one of the first or the second means characterized in that the cut-pile pile fiber consists of crimped multifilament fiber. The pile fiber 1c of the cut pile employed in this seal member might be crimped high-density pile comprising multifilament employing filament made of acrylic/polyester-type fiber of modified cross-section such that the outside circumference is split after the fashion of a "*"-like shape. Furthermore, besides "*"-like shape, the cross-sections of the respective filaments of the crimped pile fiber might moreover be of star-like shape or circular cross-section, or might be of hollow cross-section or other such modified cross-section, a cross-sectional shape such as will cause there to be increased surface area being preferred.

For the cut-pile pile fiber consisting of crimped multifilament fiber, reference can be made to the description and figure of a "woven structure peripheral to a cut-pile ground yarn portion of a shaft seal (t-type)" in US2019/0017544A1. The "woven structure peripheral to a cut-pile ground yarn portion of a shaft seal (t-type)" has a configuration consisting of base 1e, front lining warp yarn 1f, front weft yarn 1g, back lining warp yarn 1h, and back weft yarn pile fiber 1j.

A fourth means in accordance with the present invention is the seal member for the ball transfer 1 according to any one of the first through third means characterized in that cut pile comprises woven fabric.

A fifth means in accordance with the present invention is the seal member for the ball transfer 1 according to any one of the first through third means characterized in that cut pile comprises knit fabric.

A sixth means in accordance with the present invention is a ball transfer 100 characterized in that, at the ball transfer having the main body 101 which has the socket 102, the inner surface of which is the hemispherical concave surface 102a, the plurality of ball bearings 103 arranged at the main body socket, the primary ball, diameter of which is greater than that of said ball bearings and which is rotatably supported by the socket by way of the ball bearings, and the housing-like case 105 which surrounds the main body socket and rotatably supports the ball bearings and the primary ball at the bearing portion thereof and which has the hole from which the portion of the primary ball is made to protrude at the upper surface of the primary ball socket, the seal member for the ball transfer according to any one of the first through the fifth means is arranged such that, at the space formed between the housing-like case and the primary ball and the main body 106, the fiber tip portion is bent so as to occlude the gap between said primary ball and said housing-like case 107 and cause said fiber tip portion to abut the primary ball, the seal member for said ball transfer being made to adhere to the housing-like case by the adhesive member for causing adhesion between the seal member comprising the pile and the housing-like case.

BENEFIT OF INVENTION

Because seal members in conventional products which are metal seals, felt, rubber seals, and resin seals are all such that particulate produced by wear due to rolling contact between the large ball and the small balls and the small balls and the case is scraped away therefrom by such seal members, particulate due to wear accumulates at the interior. However, the foregoing means for solving the problems in accordance with the present invention are such that, by causing a seal member thereof to be arranged so as to cause high-density pile comprising fine fibers to come in contact with the large ball toward the interior of the case, it is possible to provide the benefit whereby the particulate due to wear that adheres to the large ball is made to cling to the pile and is quickly removed therefrom. As a result, the situation in which particulate due to wear remains and causes further wear of the small balls is eliminated. In addition, not only does this contribute to increased product life, but it also makes it possible to obtain the benefit whereby sound prevention characteristics during use are greatly improved.

Furthermore, the foregoing means for solving the problems in accordance with the present invention are such that thickness of that pile seal member is small, and length of the pile fibers can be controlled. And with respect to adhesion of the pile seal member used in the present invention to the case, it is possible to make use of the location that has served as gap until now, i.e., such gap as is produced by the locus required to prevent the large ball from becoming dislodged and as is structurally necessary for it to serve in its role as a ball transfer or such gap as is produced by the portion where a flange is to be attached to prevent scattering of the small balls, as the installation site for the pile seal member, it being possible for adhesion to be carried out at said site such that there is no inefficiency as a result of thereof. For this reason, the foregoing means for solving the problems in accordance with the present invention are such that it is possible to provide a novel ball transfer at which a pile seal member in accordance with the present invention is installed, without the need to manufacture a new die, and without the need to change the shape of the case that has been used conventionally.

Furthermore, where product shape and/or dimensions of the ball transfer itself are to be changed, with a conventional seal member such as a rubber seal or a resin seal for a ball transfer, it has been necessary to fabricate a new die for molding of the rubber seal or resin seal to accommodate the change in product shape and/or dimensions of the ball transfer, which has been a factor in causing increase in manufacturing cost. Furthermore, it has also been the case that there have been few degrees of freedom at times when the design is to be changed, and the speed with which changes in design could be accommodated has been low. However, the pile seal members in accordance with the means of the present invention are such that they provide a wide variety of extremely excellent benefits, such as the fact that because they do not require an expensive die but can be accommodated by merely fabricating an extremely inexpensive punching die for pile fabric, mass production thereof is possible and they permit great benefit in terms of cost reduction; and moreover, they permit many degrees of freedom at times when the design is to be changed, and they are such that the speed with which changes in design can be accommodated is high.

In addition, because seal members of the conventional type such as metal seals, felt, rubber seals, and resin seals have been inferior with respect to ability to conform to the case, precise dimensional accuracy has been required for provision of adequate sealing effect. However, the foregoing means for solving the problems in accordance with the present invention are such that because that pile seal member is woven fabric, ability to conform to the case is very good. For this reason, as compared with other seal members of the conventional type such as metal seals, felt, rubber seals, and resin seals, it does not require precise dimensional accuracy, and it is also extremely easy to assemble.

EMBODIMENTS FOR CARRYING OUT INVENTION

Below, embodiments of the present invention are described in concrete terms with reference as appropriate to the drawings and descriptions of working examples. Note, however, that said descriptions should not be interpreted in a manner that would limit the form taken by the seal member for ball transfer, and ball transfer employing same, of the present invention. Reference numbers shown in the drawings are described by the terms listed in the Explanation of Reference Numbers that are also used throughout the specification.

WORKING EXAMPLES

1. Materials and Methods

To carry out evaluation of the performance of ball transfers employing seal members for ball transfers in accordance with the present invention, evaluation was carried out with respect to groups including a comparative example in which no seal was employed, a device in which an MF seal was employed as seal member employing pile fiber in woven pile fabric constituting a working example of the present invention, and four types of devices having conventional seal members that were chosen as comparative examples.

| | |
|---|---|
| Comparative Example 1 | No seal |
| Working Example 2 | MF seal (pile seal member made of acrylic/polyester-type fiber; Mirco Fiber) |
| Comparative Example 3 | Rubber seal (made of NBR) |
| Comparative Example 4 | Resin seal (made of polypropylene (PP)) |
| Comparative Example 5 | Metal seal (made of SS400; heat-treated) |
| Comparative Example 6 | Felt (pressed-wool-type) |

Figure 5:
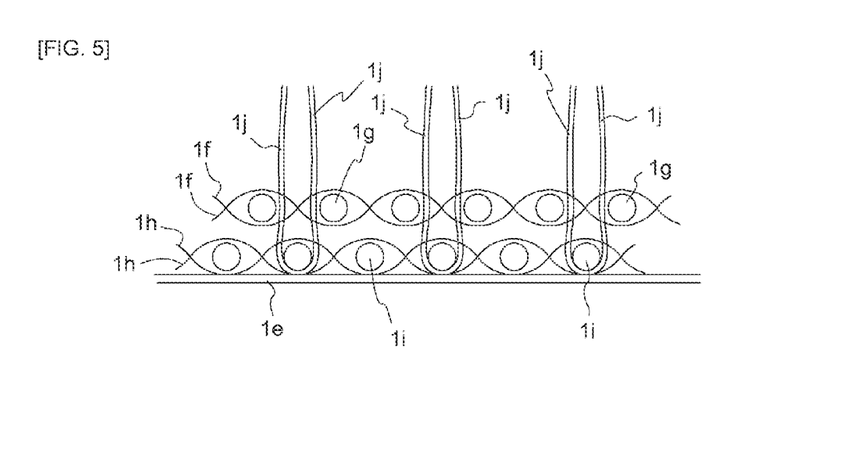
FIG. 5 Schematic view showing woven structure peripheral to a cut-pile ground yarn portion of a shaft seal (t-type).

The MF seal having a pile seal member which was a seal member for a ball transfer at Working Example 2 was a seal member employing pile fiber in T-type pile woven fabric (FIG. 5), being of high density and being crimped pile comprising multifilament employing filament made of acrylic/polyester-type fiber of modified cross-section such that the outside circumference was split after the fashion of a "*"-like shape. Note that length of the pile at the pile used during testing was 2.2 mm.

Figure 4:
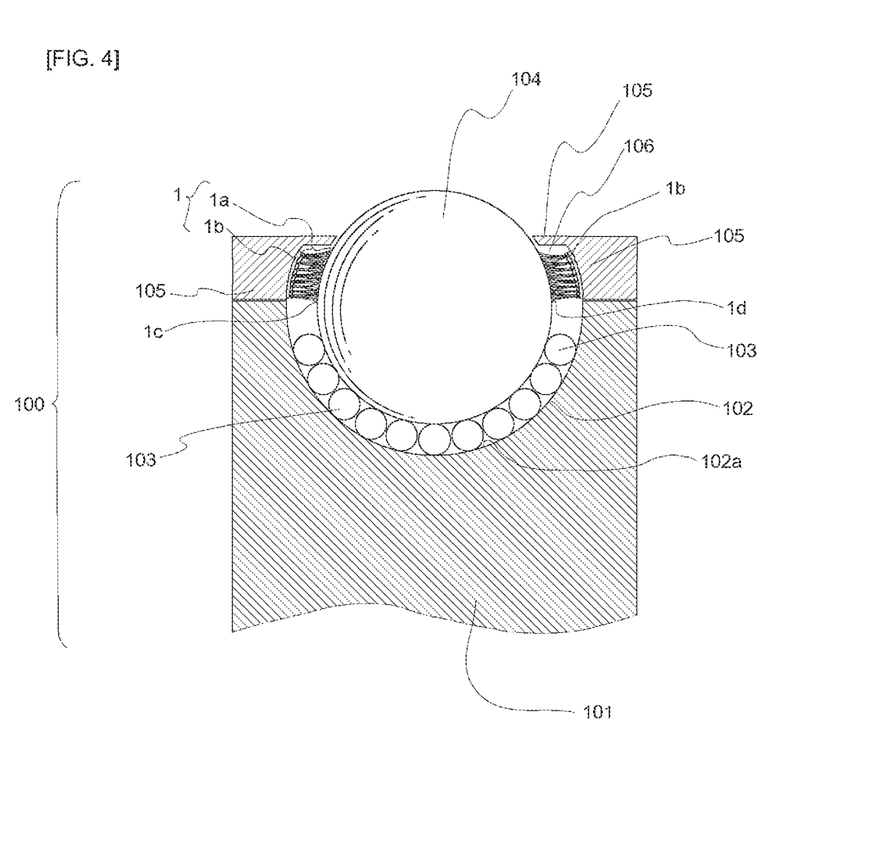
FIG. 4 Shows a partial cross-sectional view of a ball transfer that distributes the pile seal material for the ball transfer.

Evaluation of performance was carried out using ball transfers (Model C-10H; Freebear Corporation, Japan) to respectively fabricate ball transfers in which seal members employing such respective types of seal members were arranged. The MF seal having a pile seal member which was a seal member for a ball transfer was such that the pile of the MF seal was made to came in contact with the large ball by using adhesive to cause the MF seal, which was arranged in the gap between the case and the large ball of the ball transfer, to adhere to the case (FIG. 4). Evaluation of performance of ball transfers was carried out by evaluating frictional resistance, noise, seal characteristics, and small ball diameter. Those having rubber seals, resin seals, metal seals, and felt were manufactured in similar fashion as the conventional product (Freebear Corporation; Japan).

2. Evaluation of Endurance Using an Operating Test Apparatus

Ball transfers to which the respective types of seal members were attached were installed in upward-facing fashion at a horizontal base endowed with adequate rigidity. A rotating drum ($\phi$150) of sufficiently large diameter as compared with that of the large ball ($\phi$25.4) was thereafter lowered onto the large ball from a location directly thereabove, and the applied load was increased to the load capacity of the ball transfer. An applied load of 1500 N was employed.

Next, the large ball of the ball transfer was made to rotate at the designated rotational speed for a time corresponding to its rated life. Circumferential speed of the rotating drum was set to 1 m/s. The load that was applied in the vertical direction and the lateral load produced as a result of rotation were respectively measured using load cells. A vertical load cell was used to measure applied load (N), and a horizontal load cell was used to measure frictional resistance (N). The coefficient of friction (horizontal load cell/vertical load cell) was thereafter calculated from the measured applied load and frictional resistance. A coefficient of friction value of 0.030 was set as a limiting value for the device.

Furthermore, noise produced when the large ball of the ball transfer was made to rotate was measured before and after operational testing. Following operational testing, seal characteristics were investigated, diameters of small balls were measured, and investigation was carried out to determine the degree to which there was generation of particulate due to wear.

In specific terms, frictional resistance, coefficient of friction, noise, seal characteristics, and small ball diameter were measured using the following Procedures.

•Frictional Resistance

The force produced in accompaniment to rotation of the large ball which tended to cause the ball transfer to slide in the horizontal direction was measured 5 times using a horizontal load cell, the average thereof being taken to be the characteristic value thereof

•Coefficient of Friction

Being calculated from the foregoing frictional resistance, this was calculated from horizontal load cell value/vertical load cell value. Measurement of lateral load was carried out continuously all throughout the time that operation was taking place, and whereas it was normally the case that rotation would stop and the test would be interrupted if the limiting value was reached, for the present purposes of investigating the increase in resistance the limiter was disabled and rotation was allowed to proceed until the rated time was reached.

•Noise

A sound level meter was used to measure the noise produced when the large ball of the ball transfer as it existed prior to testing and as it existed after having been allowed to operate for 100,000 m was made to rotate as a result of causing the large ball to rotate when an iron plate was pressed thereagainst and this was made to slide for a prescribed time.

•Seal Characteristics 3 g of craft sand was allowed to accumulate over the ball transfer as it existed after having been allowed to operate for 100,000 m, and this was thereafter made to rotate as a result of being finger-operated 5 times in the horizontal and vertical directions. The cap was thereafter removed and visual inspection was carried out to determine whether debris had entered into the interior thereof. Note that particle diameter of the craft sand was 0.1 mm to 0.3 mm. Where seal characteristics were satisfactory as determined based on the fact that craft sand had not entered into the interior, this was evaluation as GOOD; where seal characteristics were unsatisfactory as determined based on the fact that craft sand had entered into the interior, this was evaluation as BAD.

•Small Ball Diameter

Following evaluation, the small balls were degreased, following which the diameters thereof were measured using a micrometer, the average value thereof being taken to be the characteristic value thereof 3. Results Results of evaluation are shown in TABLE 1, below, and at FIG. 1 through FIG. 3.

TABLE 1

| Freebear Model No. | Seal member | Before testing | | | | After having been allowed to operate for 100,000 m | | | | Seal characteristics |
|---|---|---|---|---|---|---|---|---|---|---|
| | | Frictional resistance [N] | Coefficient of friction [—] | Noise [dB] | Small ball diameter [mm] | Frictional resistance [N] | Coefficient of friction [—] | Noise [dB] | Small ball diameter [mm] | |
| C-10H | No seal | 29.9 | 0.020 | 66.43 | 3.9688 | 39.7 | 0.0265 | 77.63 | 3.9614 | BAD |
| | Metal seal | 32.7 | 0.022 | 70.93 | 3.9688 | 32.6 | 0.0217 | 79.83 | 3.9653 | GOOD |
| | Felt | 39.5 | 0.026 | 60.87 | 3.9688 | 46.2 | 0.0308 | 75.13 | 3.9640 | GOOD |
| | Rubber | 34.8 | 0.023 | 62.47 | 3.9688 | 44.9 | 0.0299 | 80.37 | 3.9652 | GOOD |
| | Resin (PP) | 35.2 | 0.023 | 59.23 | 3.9688 | 33.1 | 0.0221 | 76.87 | 3.9651 | GOOD |
| | MF seal | 32.3 | 0.022 | 59.23 | 3.9688 | 32.4 | 0.0216 | 71.53 | 3.9676 | GOOD |

Based on the results presented in the TABLE, the following was learned.

a. Frictional Resistance and Coefficient of Friction

Figure 1:
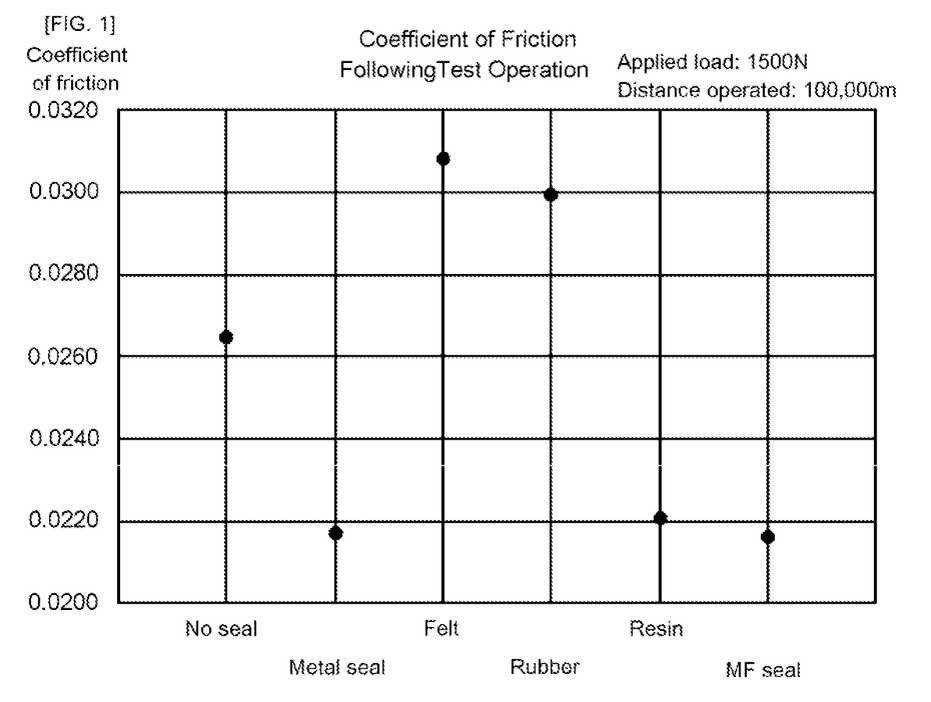
FIG. 1 Shows results of testing in which coefficient of friction was measured following test operation.

After having been allowed to operate for 100,000 in, the MF seal having a pile seal member which was a seal member for a ball transfer in accordance with the present invention exhibited excellent frictional resistance and coefficient of friction (TABLE 1; FIG. 1). The metal seal which was a conventional seal member exhibited a frictional resistance that was slightly greater than that of the MF seal but exhibited a coefficient of friction that was of approximately the same order as that of the MF seal (TABLE 1; FIG. 1). In contradistinction thereto, the resin seal which was a conventional seal member was such that the frictional resistance and coefficient of friction thereof were more greater for the MF seal than for the metal seal (TABLE 1; FIG. 1). When frictional resistance and coefficient of friction are low, this means that the rotational resistance of the large ball that is produced in accompaniment to operation will be low, and that excellent performance will be exhibited thereby.

Based on these test results, it is clear that the MF seal having a pile seal member which was a seal member for a ball transfer in accordance with the present invention displayed performance such that the frictional resistance and coefficient of friction exhibited were superior to those of conventional seal members.

b. Noise

Figure 2:
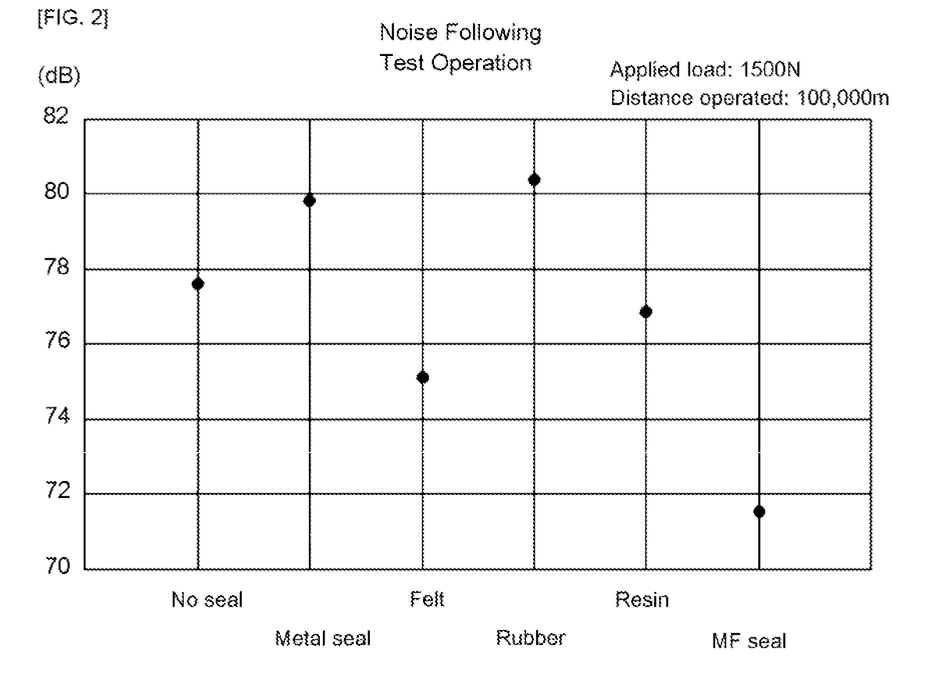
FIG. 2 Shows results of testing in which noise was measured following test operation.

Noise after having been allowed to operate for 100,000 m was such that that of the MF seal having a pile seal member which was a seal member for a ball transfer in accordance with the present invention was markedly low, being the lowest among the devices employing a seal member that were tested (TABLE 1; FIG. 2). In contradistinction thereto, the metal seal which was a conventional seal member was such that the noise thereof was greater than that of the MF seal, and the rubber seal which was a conventional seal member was such that the noise thereof was greater still than that of the metal seal (TABLE 1; FIG. 2).

Based on these test results, it is clear that the MF seal having a pile seal member which was a seal member for a ball transfer in accordance with the present invention was such that the noise thereof was particularly low, and that it would be possible to obtain products therefrom having particularly superior sound-dampening characteristics, as compared with conventional seal members.

c. Amount of Wear at Small Balls

Figure 3:
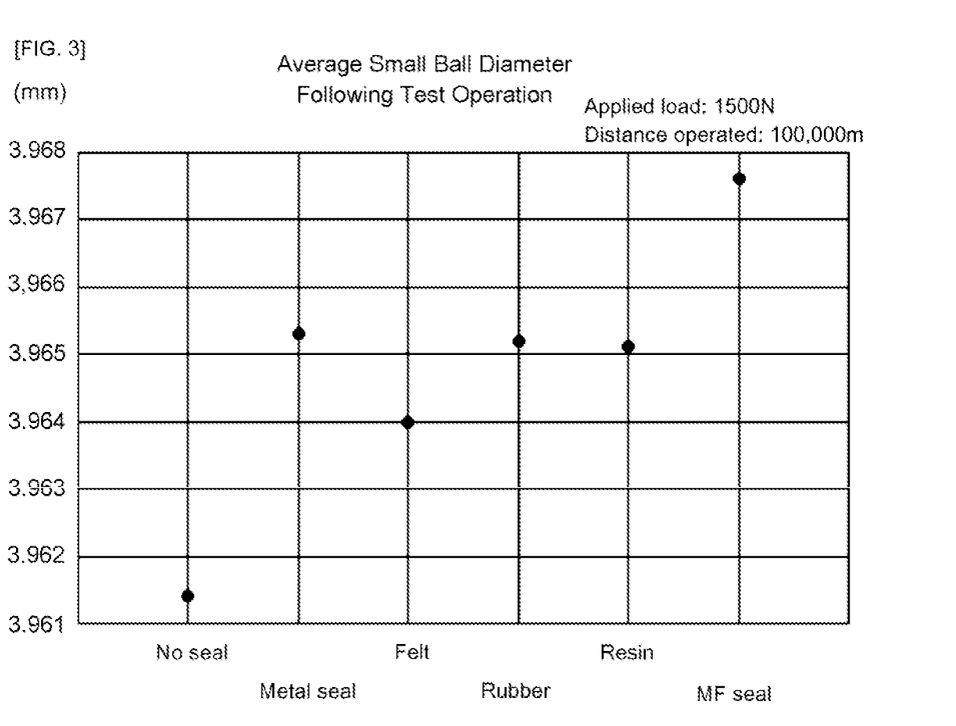
FIG. 3 Shows results of testing in which average diameter of small balls was measured following test operation.

The sizes of the diameters of the small balls at the MF seal having a pile seal member which was a seal member for a ball transfer in accordance with the present invention were particularly large, there having been almost no wear thereat (TABLE 1; FIG. 3). In contradistinction thereto, the diameters of the small balls at the rubber seal which was a conventional seal member were small (TABLE 1; FIG. 3).

Furthermore, the diameters of the small balls at the resin seal which was a conventional seal member were smaller still (TABLE 1; FIG. 3). Where diameters of small balls were large, this may be understood to mean that the small balls did not experience wear during operation, and that it was possible for the performance expected therefrom in their role as ball bearings to be maintained thereby. On the other hand, where diameters of small balls were small, this may be understood to mean that the small balls experienced wear during operation, that it was not possible for the size thereof as designed in light of their role as ball bearings to be maintained thereby, that the expected performance could not be delivered thereby, and that there was generation of particulate as a result of the wear of the small balls.

Based on these test results, it is clear that the MF seal having a pile seal member which was a seal member for a ball transfer in accordance with the present invention was such that the amount of wear at the small balls thereof was particularly small, that it would be possible for the performance expected therefrom in their role as ball bearings to be maintained thereby for a long time, and that it would be possible to obtain superior products therefrom that generate a particularly small amount of particulate due to wear, as compared with conventional seal members.

d. Seal Characteristics

At all except that which had no seal, i.e., at that with the MF seal having a pile seal member which was a seal member for a ball transfer in accordance with the present invention and at each of those with the conventional seals, no entry of craft sand thereinto was observed. Based on these test results, it is clear that the MF seal having a pile seal member which was a seal member for a ball transfer in accordance with the present invention functioned as a seal member by preventing entry of foreign objects thereinto from the exterior in similar fashion as with conventional seal members.

4. Discussion

As a result of the evaluation carried out by means of the foregoing testing, it can be understood that there are problems such as the following with failure to employ a seal member at a ball transfer or with employment of seal members (metal seals, felt, rubber seals, resin seals) as have come to be used thereat conventionally.

Where no seal member is employed at the ball transfer, there is occurrence of a problem whereby foreign objects easily enter the interior by way of gap(s) between the large ball and the case of the ball transfer, which interferes with rotation of the large ball during use, and causes movement of the ball transfer to become abnormal. Furthermore, there is occurrence of a problem whereby the small balls wear when used over a long period of time, causing movement of the ball transfer to become abnormal and causing generation of noise. The normal operating life of the ball transfer is also shortened. Moreover, there is also occurrence of a problem whereby particulate produced as a result of wear of the small balls is scattered thereabout, causing the surroundings to become contaminated and interfering with operation of other ball transfer(s).

The structure of a ball transfer being such that a plurality of small balls support a large ball, the fact that there is point contact between the small balls and the socket increases the tendency for there to be occurrence of fatigue and wear, as a result of which there will be increased tendency for generation of particulate to occur at the interior. Where there is particulate generation at the interior, it is thought that metal particulate will act in similar fashion as an abrasive to cause wear to proceed even further.

Where a metal seal of the conventional type is employed in a ball transfer, there is occurrence of a problem whereby there is a large amount of noise that is produced due to sliding. Metal seals are arranged in such fashion as to cause the gap between the large ball and the case to be small but not so small as to significantly interfere with rotation of the large ball, as a result of which there is occurrence of a problem whereby the metal seal comes in contact with the large ball and causes a large amount of noise to be produced during operation. Furthermore, not only does wear of the small balls cause production of particulate, but the fact that the particulate which is produced accumulates within the case causes wear of the small balls to proceed even further, and causes the diameters of the small balls to decrease. The normal operating life of the ball transfer is also shortened.

Where felt of the conventional type is employed in a ball transfer, there is occurrence of a problem whereby the lubricating oil with which the felt was impregnated is used up in accompaniment to operation, as a result of which there will be an increase in frictional resistance. Furthermore, not only does wear of the small balls cause production of particulate, but the fact that the particulate which is produced accumulates within the case causes wear of the small balls to proceed even further, and causes the diameters of the small balls to decrease. There is also occurrence of a problem whereby the normal operating life of the ball transfer is shortened.

Where a rubber seal of the conventional type is employed in a ball transfer, there is occurrence of a problem whereby the fact that a nip is formed when the rubber seal comes in contact with the large ball causes increase in frictional resistance. In addition, there is occurrence of a problem whereby the fact that the rubber seal vibrates in accompaniment to rotation of the large ball causes there to be an increase in the amount of noise. Furthermore, not only does wear of the small balls cause production of particulate, but the fact that the particulate which is produced accumulates within the case causes wear of the small balls to proceed even further, and causes the diameters of the small balls to decrease. Moreover, not only is there occurrence of a problem whereby nip formation causes the rubber seal to be pulled thereinto or stretched thereby or the like, as a result of which it may be the case that a portion of the rubber seal suffers damage, seal characteristics are impaired, and there is a larger amount of noise, there is also occurrence of a problem whereby particulate produced as a result of wear of the small balls is scattered thereabout, causing the surroundings to become contaminated and interfering with operation of other ball transfer(s).

Where a resin seal of the conventional type is employed in a ball transfer, there is occurrence of a problem whereby there is wear of the small balls within the case and the particulate which is produced accumulates in sludge-like fashion, causing the diameters of the small balls to decrease even further in accompaniment to increase in the amount of particulate that is produced, as a result of which the normal operating life of the ball transfer is also shortened.

It is thus clear, for seal members that have been used conventionally, that, with regard to frictional resistance, noise, seal characteristics, and the normal operating life of the ball transfer, it must be acknowledged that there are problems to be solved.

In contrast thereto, as a result of the evaluation carried out by means of the foregoing testing, it was found that use of an MF seal having a pile seal member which was a seal member for a ball transfer in accordance with the present invention permitted performance that exceeded that of conventional seal members with regard to all of the basic ball transfer performance categories studied, i.e., frictional resistance, noise, seal characteristics, and small ball diameter. This means that the MF seal having a pile seal member which was a seal member for a ball transfer in accordance with the present invention did not exhibit the problems observed with conventional seal members such as are described above but was in fact superior to employment of conventional seal members with respect to each of frictional resistance, noise, and seal characteristics, and possessed product characteristics that were greater than those of conventional products.

In addition, special mention should be made of the fact that small ball diameter after enduring 100,000 m was greatest for the MF seal having a pile seal member which was a seal member for a ball transfer. Where the aforementioned seal members of the conventional type were employed, particulate due to mutual wearing of balls which occurred as a result of rotation was a factor in causing further wear of small balls and production of particulate as a result thereof, as well as generation of noise. However, observations made following use of an MF seal revealed that such particulate due to wear appeared to be captured within and clinging to pile. Furthermore, upon investigating the MF-seal-equipped socket interior, it was determined that any particulate that might have been generated had been removed and that the degree of surface roughness at the portion where wear occurs was satisfactory. It can be understood that causing a ball transfer to be equipped with an MF seal will make it possible for metal particulate which is generated at the interior to be quickly removed, as a result of which it will be possible to prevent wear of the socket and to observe an effect whereby life is increased. Based on this fact, it is clear that the MF seal having a pile seal member which is a seal member for a ball transfer in accordance with the present invention is such that the fact that particulate due to wear clings to the pile of the MF seal prevents further wear of the small balls, and also contributes to effects whereby endurance is improved and noise is decreased. This means that use of an MF seal having a pile seal member which is a seal member for a ball transfer in accordance with the present invention will make it possible to provide novel ball transfer products that will operate normally for longer periods of time.

EXPLANATION OF REFERENCE NUMERALS

1 Seal member for a ball transfer
1a Seal member employing pile fiber
1b Adhesive member
1c Pile fiber
1d Fiber tip portion which is bent so as to occlude a gap between the primary ball and the housing-like case and caused said fiber tip portion to abut the primary ball 1*e* Base
1*f* Front lining warp yarn
1*g* Front weft yarn
1*h* Back lining warp yarn
1*i* Back weft yarn
1*j* Pile fiber
100 Ball transfer
101 Main body which has a socket
102 Socket
102*a* Inner surface of which is a hemispherical concave surface
103 Ball bearing
104 Primary ball
105 Housing-like case
106 Space formed between the housing-like case and the primary ball and the main body
107 Gap between said primary ball and said housing-like case

The invention claimed is:

1. A seal member for a ball transfer comprising:
a seal member employing a pile fiber that, at a ball transfer having a main body which has a socket, an inner surface of which is a hemispherical concave surface, a plurality of ball bearings arranged at the main body socket, a primary ball, diameter of which is greater than that of said ball bearings and which is rotatably supported by the socket by way of the ball bearings, and a housing-like case which surrounds the main body socket and rotatably supports the ball bearings and the primary ball at a bearing portion thereof and which has a hole from which a portion of the primary ball is made to protrude at an upper surface of the primary ball socket, is arranged such that, at a space formed between the housing-like case and the primary ball and the main body, a fiber tip portion is bent so as to occlude a gap between said primary ball and said housing-like case and cause said fiber tip portion to abut the primary ball; and
an adhesive member for causing adhesion between the seal member and the housing-like case.

2. The seal member for the ball transfer according to claim 1 characterized in that the pile fiber of the seal member is a cut pile.

3. The seal member for the ball transfer according to claim 2, wherein the cut-pile pile fiber consists of a crimped multifilament fiber.

4. The seal member for the ball transfer according to claim 2, wherein the cut pile comprises a woven fabric.

5. The seal member for the ball transfer according to claim 2, wherein the cut pile comprises a knit fabric.

6. A ball transfer comprising:
a main body which has a socket, an inner surface of which is a hemispherical concave surface,
a plurality of ball bearings arranged at a main body socket;
a primary ball, a diameter of which is greater than that of said ball bearings and which is rotatably supported by the socket by way of the ball bearings;
a housing-like case which surrounds the main body socket and rotatably supports the ball bearings and the primary ball at a bearing portion thereof and which has a hole from which a portion of the primary ball is made to protrude at an upper surface of the primary ball socket;
a seal member employing a pile fiber that is arranged such that, at a space formed between the housing-like case and the primary ball and the main body, a fiber tip portion is bent so as to occlude the gap between said primary ball and said housing-like case and cause said fiber tip portion to abut the primary ball; and
an adhesive member providing adhesion between the seal member and the housing-like case.

7. The transfer according to claim 6, wherein the pile fiber is a cut-pile pile fiber including a crimped multifilament fiber.

8. The ball transfer according to claim 6, wherein the pile fiber is a cut pile including a woven fabric.

* * * * *